BROWN & GILMAN.
Thill Coupling.
No. 113,624.
Patented April 11, 1871.
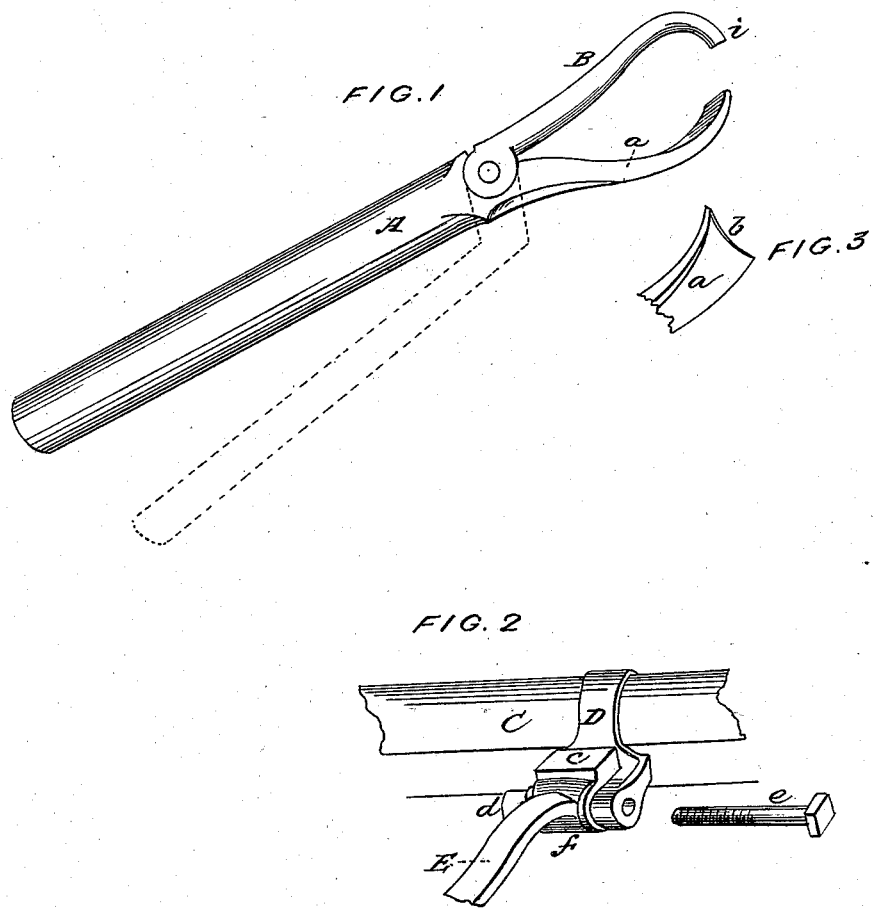

United States Patent Office.

THOMAS H. BROWN AND CHARLES E. GILMAN, OF CHICAGO, ILLINOIS; SAID GILMAN ASSIGNS HIS RIGHT TO SAID BROWN.

Letters Patent No. 113,624, dated April 11, 1871.

IMPROVEMENT IN APPARATUS FOR COMPRESSING AND INSERTING RUBBER BLOCKS INTO CARRIAGE-CLIPS.

The Schedule referred to in these Letters Patent and making part of the same.

We, THOMAS H. BROWN and CHARLES E. GILMAN, of the city of Chicago, in the county of Cook and State of Illinois, have invented a certain new and useful Compression-Hook, of which the following is a full description, reference being had to the accompanying drawing making a part of this specification, in which—

Figure 1 represents my device.

Figure 2 represents some parts of a carriage, and is for the purpose of aiding in explaining the use of the device.

Figure 3 is a detail.

In manufacturing carriages it is customary to place a piece of rubber in the clip and behind the end of the shaft-iron, to prevent rattling; and as this rubber must be compressed, it is difficult to bring the shaft back to the proper position to receive the bolt.

Our device is primarily designed to be used to force the shaft back to its place, at the same time compressing the rubber so that the bolt can be inserted. It may be used for other purposes.

This device consists of two parts:

A lever, A, one end of which, $a$, is of peculiar form, as represented in fig. 1 and in the detail, fig. 3. It must be curved as shown, so that this portion, when in use, can be passed around the shaft-iron, while the extreme end $b$ is broad, curved, and somewhat sharp, (see fig. 3,) so that it will not slip when in use.

To this part A is pivoted a hook, B, the extreme end of which, $i$, must be bent so that it can be readily inserted into one of the bolt-holes in the clip.

The two parts A B may be jointed together or simply riveted.

In fig. 2—

C represents a portion of an axle;

D, the clip; and $c$, the rubber to prevent rattling.

E, the shaft-iron.

In use, the hook $i$ is inserted into one of the bolt-holes in the clip, (for example, at $d$,) $a$ is brought under and to the opposite side of the shaft-iron E, and the sharp edge $b$ brought in contact with the shaft-iron at $f$, when, by the use of the lever A, the shaft-iron can be readily pressed back against the rubber $c$, thereby compressing the same so as to permit the bolt $e$ to be easily inserted. We find this device efficient in actual use.

If desired, the hook B may be provided with a handle, as indicated by dotted lines in fig. 1, though this is not necessary, and, in some respects, would be found inconvenient.

It is essential in making this device to retain substantially the form shown and described; otherwise it cannot be applied to the uses for which it is designed.

What we claim as new is—

The compression-hook herein described, consisting of the two parts A B, when said two parts are formed and pivoted together, as shown and described, and for the purposes set forth.

THOMAS H. BROWN.
CHAS. E. GILMAN.

Witnesses:
   E. P. MORSE,
   E. A. WEST.